UNITED STATES PATENT OFFICE.

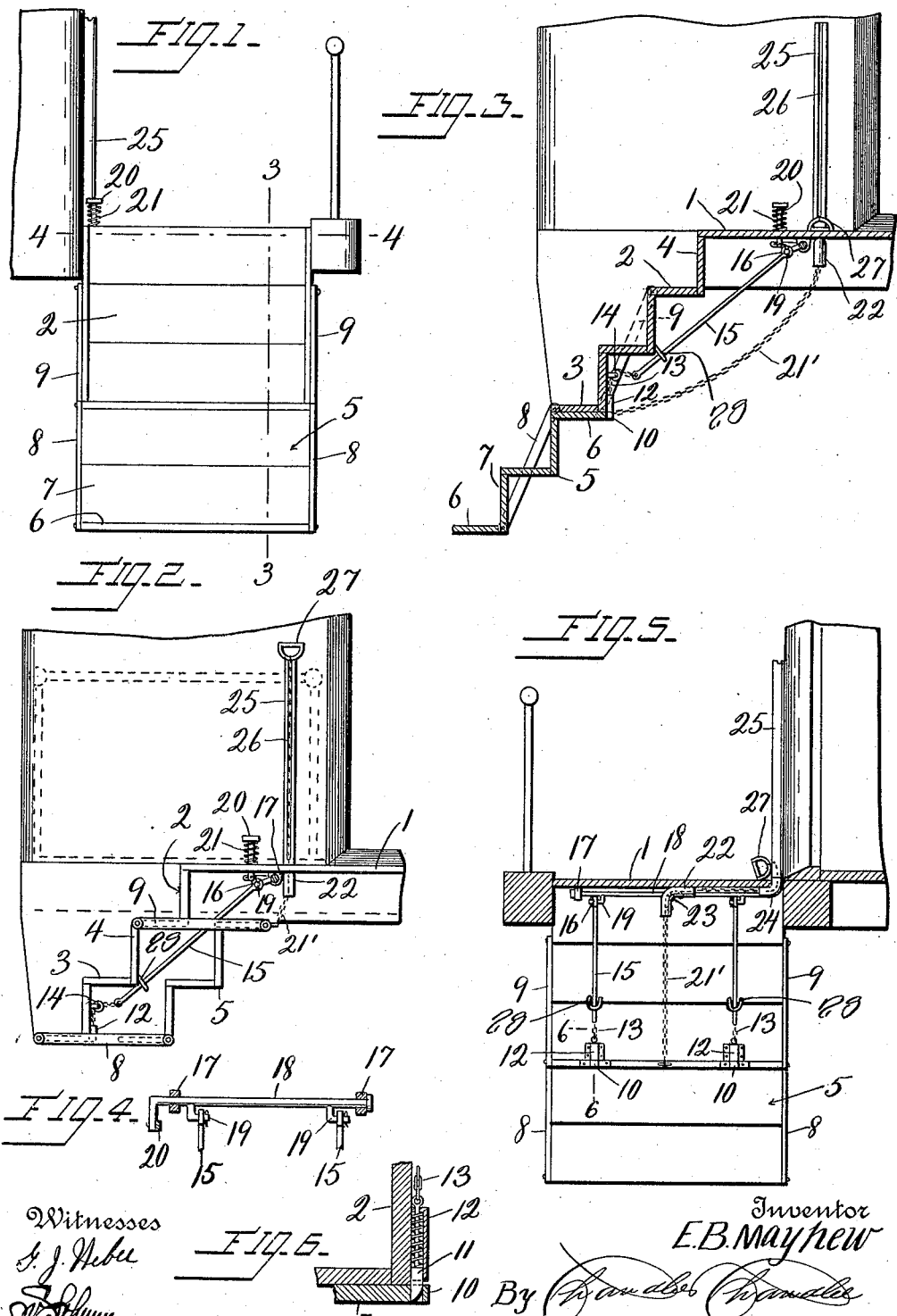

EDWIN B. MAYHEW, OF LEVITA, TEXAS.

FOLDING CAR-STEP.

1,062,346.  Specification of Letters Patent.  Patented May 20, 1913.

Application filed February 13, 1913. Serial No. 748,189.

*To all whom it may concern:*

Be it known that I, EDWIN B. MAYHEW, a citizen of the United States, residing at Levita, in the county of Coryell, State of Texas, have invented certain new and useful Improvements in Folding Car-Steps; and I do hereby declare the following to be a full, clear, and exact description of the invention, such as will enable others skilled in the art to which it appertains to make and use the same.

The present invention is directed to folding car steps, and has for its object to provide a supplemental step section, which is connected to the stationary step section and operable to be lowered in close proximity to the platform to permit passengers to alight, and to be easily folded beneath the stationary step section when not in use.

With these and other objects in view, this invention resides in the novel features of construction, formation, combination and arrangement of parts to be hereinafter more fully described, claimed and illustrated in the accompanying drawing, in which:—

Figure 1 is a front elevation of the step showing it in its extended position. Fig. 2 is an end view showing the supplemental step section in its folded position. Fig. 3 is a sectional view on line 3—3 of Fig. 1. Fig. 4 is a sectional view on line 4—4 of Fig. 1. Fig. 5 is a rear view showing the supplemental step in its lowered position. Fig. 6 is a sectional view on line 6—6 of Fig. 5.

Referring to the drawing, the numeral 1 designates the platform of a railway coach having depending therefrom the stationary step section 2, which is of the usual construction and consists of treads 3 and risers 4.

The supplemental step section 5 comprises treads 6 and risers 7. It will be of course understood that the number of treads of the supplemental step section may be varied as desired.

Pivotally connected at their upper ends to the sides of the treads 3, of the stationary step section, are links 8, the lower ends of which being similarly connected to the lowermost tread of the supplemental step section 5, said links being connected to the lowermost tread of the stationary step section, as clearly shown in Fig. 2. Similar links 9 are provided and have their upper ends pivotally connected to one of the risers 4 of the stationary step section, and their lower ends similarly connected to the uppermost tread of the supplemental step section, whereby the supplemental step section is permitted to swing to its folded or extended position.

Connected to the rear edge of the uppermost tread of the step section 5 are keepers 10, said keepers being engageable by the spring pressed bolts 11 which are slidably mounted in the casings 12 which are connected to the rear side of the lowermost riser of the stationary step section 2. Thus it will be seen that when the step section 5 swings outwardly the uppermost tread thereof will bear against the lowermost tread of the step section 2, and at which time the bolts 11 will automatically engage the keepers 10, thereby holding the step section 5 rigidly in its extended or operative position.

Connected to the upper ends of the bolts 11 are chains 13, which pass over pulleys 14, said pulleys being supported upon the rear face of the lowermost riser of the stationary step section, said chains having their upper ends connected to the lower ends of the rods 15. The upper ends of the rods 15 are provided with eyes 16, the purpose of which will appear later.

Journaled in suitable bearings 17 beneath the platform 1 is a rock shaft 18 having formed thereon lugs 19, which are arranged in parallel relation to the rock shaft and are pivotally engaged by the eyes 16 of the rods 15.

Connected to the inner ends of the rock shaft 18 is a foot lever 20, which passes through the platform 1 adjacent the front end of the car. Surrounding the lever 20 is a coil spring 21, which serves to return the shaft 18 to its normal position after the same has been rocked to withdraw the bolts 11, through the medium of the rods 15 and chains 13, from engagement with the keepers 10, so that the supplemental step section may be swung to its folded position behind the stationary step section 2.

To raise the supplemental step section 5 to its folded or inoperative position behind the fixed step section 2, a chain 21' is provided and has its lower end connected to the rear edge of the uppermost tread of the supplemental step section, and passes through a curved tubular guide 22, said guides having mounted therein wheels 23, which are engaged by the chain to prevent undue friction, said wheels being located upon the guide at its greatest point of curvature.

A similar guide 24 is connected to the platform so that its upper end opens upon the platform adjacent the front facing of the car, and has connected thereto a vertical tube 25, said tube being provided with a longitudinal slot 26, and in which the upper end of the chain 21 operates after the same has been passed through the guide 24. The extreme upper end of the chain 21′ is provided with a hand grip 27 which is adapted to engage the top of the tube 25 so as to hold the step section 5 in its folded or inoperative position.

From this construction it will be seen that upon releasing the hand grip 27 from the tube 25, the weight of the supplemental step section 5 will cause the same to swing outwardly until the spring pressed bolts 11 engage the keepers 10 of the step section 5, thus holding said section in its operative position. Now when it is desired to fold the supplemental step section it is only necessary that an authorized attendant presses upon the foot lever 20 whereupon the shaft 18 is rocked, thus shifting the rods 18 so that the chains 13 carried thereby withdraw bolts 11 from engagement with the keepers 10 whereupon the step section 5 will swing inwardly to directly under the step section 2, after which the attendant grasps the hand grip 27 and pulls upwardly thereon, thus causing the chain 21′ to raise the step section 5 rearward of the stationary step section, and upon placing the hand grip upon the upper end of the tube 25 the step section will be held firmly in its raised or inoperative position.

A suitable covering device may be employed to inclose the foot lever 21 and tube 25 so that the likelihood of the device being operated accidentally is eliminated.

To relieve the chains 13 of the weight of the rods 15, guides 28 are secured to the stationary step section, said guides being so constructed that the rods may freely slide therein.

What is claimed is:—

1. In a car step of the class described, the combination with a platform, of stationary steps depending therefrom, a supplemental step section swingingly connected thereto, keepers carried by the supplemental step section, spring pressed bolts carried by the stationary step section and adapted to engage said keepers when the supplemental step section swings to its extended position, chains connected to said bolts, a rock shaft supported by the platform, rods connecting said chains and rock shaft, a foot lever connected to the rock shaft which when operated rocks said shaft to disengage said bolts from the keepers to permit the supplemental step section to swing inwardly, and means for swinging the supplemental step section upwardly and behind the stationary steps.

2. In a car step of the class described, the combination with a platform, of stationary steps depending therefrom, a supplemental step section swingingly connected thereto, keepers carried by the supplemental step section, bolts carried by the stationary steps for engaging the keepers to hold the supplemental step section in its extended position, means for operating the bolts to disengage the keepers to permit the supplemental step section to swing inwardly, a chain connected to the supplemental step section, tubular guides carried by the platform and through which the chain passes, a tube connected to one of the guides, a slot formed in the tube for the passage of said chain, a hand grip for the upper end of the chain, said chain serving to swing the supplemental step section upwardly and behind the stationary steps, whereby said hand grip engages the upper end of the tube to hold the supplemental step section in its raised position and behind the stationary step.

In testimony whereof, I affix my signature, in the presence of two witnesses.

EDWIN B. MAYHEW.

Witnesses:
W. C. AMENT,
N. C. MILES.

---

Copies of this patent may be obtained for five cents each, by addressing the "Commissioner of Patents, Washington, D. C."